(12) United States Patent  (10) Patent No.: US 6,654,558 B2
Chen et al.  (45) Date of Patent: Nov. 25, 2003

(54) ELECTRIC FLASH AND CONNECTOR

(75) Inventors: Zhaoxiang Chen, Kawasaki (JP); Nobuyoshi Hagiuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/921,706

(22) Filed: Aug. 6, 2001

(65) Prior Publication Data

US 2002/0015590 A1 Feb. 7, 2002

(30) Foreign Application Priority Data

Aug. 7, 2000 (JP) ............................ 2000-238103

(51) Int. Cl.[7] .................................. G03B 15/03
(52) U.S. Cl. ............................ 396/182; 396/177
(58) Field of Search ............................ 396/180, 182, 396/189, 176, 177, 178; 315/241 P, 129; 362/11

(56) References Cited

U.S. PATENT DOCUMENTS

| 5,422,543 | A | * | 6/1995 | Weinberg | .................... 315/129 |
| 5,436,531 | A | * | 7/1995 | Weinberg | .................... 254/129 |
| 6,088,542 | A | * | 7/2000 | Yanai et al. | .................. 362/16 |

* cited by examiner

Primary Examiner—Russell Adams
Assistant Examiner—Arthur A Smith
(74) Attorney, Agent, or Firm—Oliff & Berridge PLC

(57) ABSTRACT

An electric flash according to the present invention comprises a flash source for emitting flash light to illuminate a subject, a trigger noise detecting part for detecting trigger noise generated from a master-side flash, and a flash control part for controlling the flashing of the flash source in synchronization with the trigger noise detected by the trigger noise detecting part. By detecting the trigger noise generated at the flashing or the like of the master-side flash which is arranged close thereto, the electric flash carries out a slave flash in synchronization with the flash timing of the master-side flash.

6 Claims, 8 Drawing Sheets

ELECTRIC FLASH AND CONNECTOR

BACKGROUND OF THE INVENTION

1. Field of the Invention

This invention relates to an electric flash which carries out a slave flash.

Further, this invention relates to a connector which connects an accessory shoe of a camera and an electric flash to allow the electric flash to carry out the slave flash.

2. Description of the Related Art

Conventionally, multiple flash photography using the slave flash has been commonly known.

FIG. 10 is a view showing the multiple flash photography.

In FIG. 10, a camera 92 is arranged with a predetermined shooting distance from a subject 91. A master-side flash 93 is connected to the camera 92.

Meanwhile, an electric flash 94 on a slave side is independently arranged at a position for additionally illuminating the subject 91. An optical detecting part 95 for detecting light of the master-side flash 93 is provided at the electric flash 94 on the slave side.

FIG. 11 is a view explaining the operation of the above slave flash.

First, the master-side flash 93 starts flash light emission according to the control of the camera 92. The optical detecting part 95 receives the flash light.

When a received light quantity exceeds a detection level of a flash start (LA shown in FIG. 11), the optical detecting part 95 detects a flash start of the master-side flash 93. The electric flash 94 on the slave side starts the flash light emission in synchronization with the detection timing.

Meanwhile, the camera 92 measures a reflected light quantity of a film (or an imaging element). When the camera 92 determines that an exposure reaches an adequate level based on the reflected light quantity, it stops the flash of the master-side flash 93. As a result of this, a flash quantity of the master-side flash 93 attenuates quickly and the received light quantity of the optical detecting part 95 decreases.

When the received light quantity falls below a detection level of a flash stop (LB shown in FIG. 11), the optical detecting part 95 detects a flash stop of the master-side flash 93. The electric flash 94 on the slave side stops the flash light emission in synchronization with the detection timing.

Incidentally, it is assumed that the master-side flash 93 and the electric flash 94 are arranged close to each other with the objective of increasing the flash quantity (the so-called guide number) and the like. When these are arranged closely like the above, there is a high possibility that the optical detecting part 95 obstructs a light path of the master-side flash 93, which may cause a disadvantage such as a shadow cast over the subject.

Further, the aforesaid electric flash 94 detects flash start of the master-side flash 93 when the received light quantity reaches the detection level LA. Hence, the flash start of the slave flash falls behind the flash start of the master-side flash 93. This delay of the slave flash causes a change in an illumination ratio between the master side and the slave side, as flash time shortens.

Moreover, there is a possibility that the flash of its own is detected by the aforesaid electric flash 94. In this case, an optical detection signal of the optical detecting part 95 is likely to be saturated, which may cause disadvantages such as the delay of the detecting operation of the flash stop, and the impossibility of detecting the flash stop.

Furthermore, there is a possibility that the aforesaid electric flash 94 detects light from the outside and flashes erroneously. In this case, it is necessary to wait for a while until the electric flash 94 is ready for the next flash, which may cause a disadvantage of missing important photo opportunities or the like.

SUMMARY OF THE INVENTION

In view of the above disadvantages, it is an object of the present invention to provide an electric flash which is disposed close to a master-side flash and able to carry out a good slave flash.

Further, it is another object of the present invention to realize a slave flash with the same principle as the electric flash of the present invention by contriving a connector for connecting an accessory shoe of a camera with a conventional electric flash in order to.

Hereinafter, the present invention will be explained.

(1) The electric flash according to the present invention is an electric flash disposed for use close to a master-side flash whose flashing is controlled by a camera, comprising a flash source for emitting flash light to illuminate a subject, a trigger noise detecting part for detecting trigger noise generated from the master-side flash, and a flash control part for controlling the flashing of the flash source in synchronization with the trigger noise detected by the trigger noise detecting part.

Generally, the master-side flash emits the trigger noise to the outside under the flash control (flash start, for example) of the master-side flash. This kind of trigger noise is weak and its radial direction is wide. Hence, it is impossible to detect the trigger noise at positions distant from the master-side flash because it is buried in surrounding electromagnetic waves.

Meanwhile, the electric flash according to the present invention is disposed for use close to the master-side flash. Therefore, the trigger noise detecting part included therein can detect the trigger noise excellently. The flash control part controls the flash source in synchronization with detection result of the trigger noise, and carries out the slave flash.

As described above, unlike the conventional art the electric flash according to the present invention does not need to receive the light of the master-side flash. Therefore, the electric flash need not be disposed unnecessarily in a light path of the master-side flash so that it is unlikely to occur that the light of the master-side flash is erroneously interrupted.

Moreover, the trigger noise is generated at the time of controlling the flashing of the master-side flash. Therefore, it is easy to detect the flash start more quickly than the conventional example which detects the start after the flash light emission is actually started. Hence, according to the present invention, it is possible to easily realize the electric flash which carries out the slave flash almost simultaneously with the flash light emission of the master-side flash.

(2) According to another aspect of the present invention, the flash control part of the above electric flash (1) stops the flashing of the flash source in synchronization with the trigger noise detected by the trigger noise detecting part after the start of the flashing of the flash source.

It is determined that the trigger noise detected after the start of the slave flash as described above is caused by the flash stop of the master-side flash. Hence, the flash control part stops the slave flash in synchronization with the trigger noise.

This operation enables the slave flash to be stopped in accordance with the timing of the flash stop of the master-side flash.

(3) According to still another aspect of the present invention, the above electric flash (1) further comprises a detection invalid part for invalidating the detection of the trigger noise in synchronization with the control timing of the flashing of the flash control part, and preventing a malfunction of the flash control part due to spontaneous noise.

In the conventional example, the malfunction is caused by receiving the slave flash of its own. Similarly, it is also concerned that the malfunction occurs due to spontaneous noise (trigger noise generated from the electric flash itself) in the present invention.

However, the trigger noise on the master side and the trigger noise on the slave side are deviated in terms of time, and hence it is possible to distinguish the source of the trigger noise on a time basis.

The detection invalid part with the above structure invalidates the detection of the noise (that is, the spontaneous noise) according to the control timing of the slave flash. Thereby, it is possible to remedy a defect that the slave flash operation is disturbed by the spontaneous noise.

(4) According to yet another aspect of the present invention, the flash control part of the above-described electric flash (1) has a function of accepting a flash control signal supplied from the camera. Further, when the supply of the flash control signal precedes the detection of the trigger noise, the flash control part inhibits the flash control by the trigger noise and controls the flashing by the flash control signal.

There are in general two types of camera having a built-in flash: one outputs the flash control signal to the outside under the condition where the built-in flash is able to flash, and the other does not output the signal.

Therefore, when performing additional illumination by an external electric flash, a user needs to determine whether he/she uses the flash control signal of the camera or carries out the slave flash, as necessary. The determination has nothing to do with artistic expression in shooting, and causes some trouble.

However, according to the present invention, when the flash control signal is supplied prior to the detection of the trigger noise, the flash control under the flash control signal is carried out with priority.

Moreover, when the flash control signal is not supplied, the slave flash based on the detection of the trigger noise is carried out.

By this operation, the flash control signal and the detection of the trigger noise do not compete with each other, and the normal flash operation of the electric flash is secured irreverent of the type of camera in the present invention. Thus, the troublesome determination is unnecessary and the easy-to-use electric flash is realized.

(5) According to still another aspect of the present invention, the master-side flash is built into the camera in the above electric flash (1). The electric flash further comprises a leg part attached to an accessory shoe of the camera being in a state that the master-side flash is able to flash (for example, the flash part is in a pop-up state).

Using the leg part with the above structure allows the electric flash to be easily disposed close to the master-side flash which is able to flash.

(6) According to yet another aspect of the present invention, the above electric flash (5) further comprises a determination part for determining whether the master-side flash is able to flash, and a malfunction preventing part for inhibiting the flash control by the trigger noise when the determination part determines that the master-side flash is not able to flash.

In the above structure, when the determination part detects that the master-side flash is unable to flash, the malfunction preventing part inhibits the flash control by the trigger noise. This decreases possibility in carrying out the slave flash due to an erroneous detection of extraneous noise as the trigger noise.

(7) According to still another aspect of the present invention, in the trigger noise detecting part of the above electric flash (1) at least one of its detection sensitivity, detection frequency, and detection waveform is/are limited to detect not an electromagnetic wave from a distance (other than the master-side flash), but the trigger noise from the master-side flash disposed close thereto.

In the above structure, at least one of the detection sensitivity, detection frequency, and the detection waveform is limited so that the trigger noise and the electromagnetic wave from a distance are discriminated from each other. This lessens possibility in erroneously carrying out the slave flash due to the electromagnetic wave from a distance.

(8) The connector according to the present invention is a connector for connecting an accessory shoe of a camera with an electric flash, comprising a trigger noise detecting part provided on a side connected to the accessory shoe, for detecting trigger noise generated from a master-side flash built into the camera, and a signal output part for outputting a flash control signal for controlling flashing to the electric flash, in synchronization with the trigger noise detected by the trigger noise detecting part.

The connector with the above structure detects the trigger noise of the master-side flash at a connecting part of the accessory shoe, and outputs the flash control signal to the electric flash according to the trigger noise.

Therefore, by using the connector, it is possible to use the conventional electric flash as it is and easily carry out the slave flash of trigger noise detection type.

Incidentally, it is preferable to add an element described in one of the above (2) to (7) to the connector as structured above. In this case, the conventional electric flash is employed to easily perform "the slave flash of the trigger noise detection type" according to any one of the above-described (2) to (7).

BRIEF DESCRIPTION OF THE DRAWING

The other objects, nature, and utility of the invention will become more apparent from the following detailed description.

FIG. 4 is a view showing an internal circuit of a master-side flash 25a;

DESCRIPTION OF THE PREFERRED EMBODIMENTS

First Embodiment

The first embodiment of the present invention is an embodiment corresponding to claims 1 to 7.

Explanation of the Structure

Hereinafter, the structure of the first embodiment will be explained with reference to the drawings.

Figure 1:
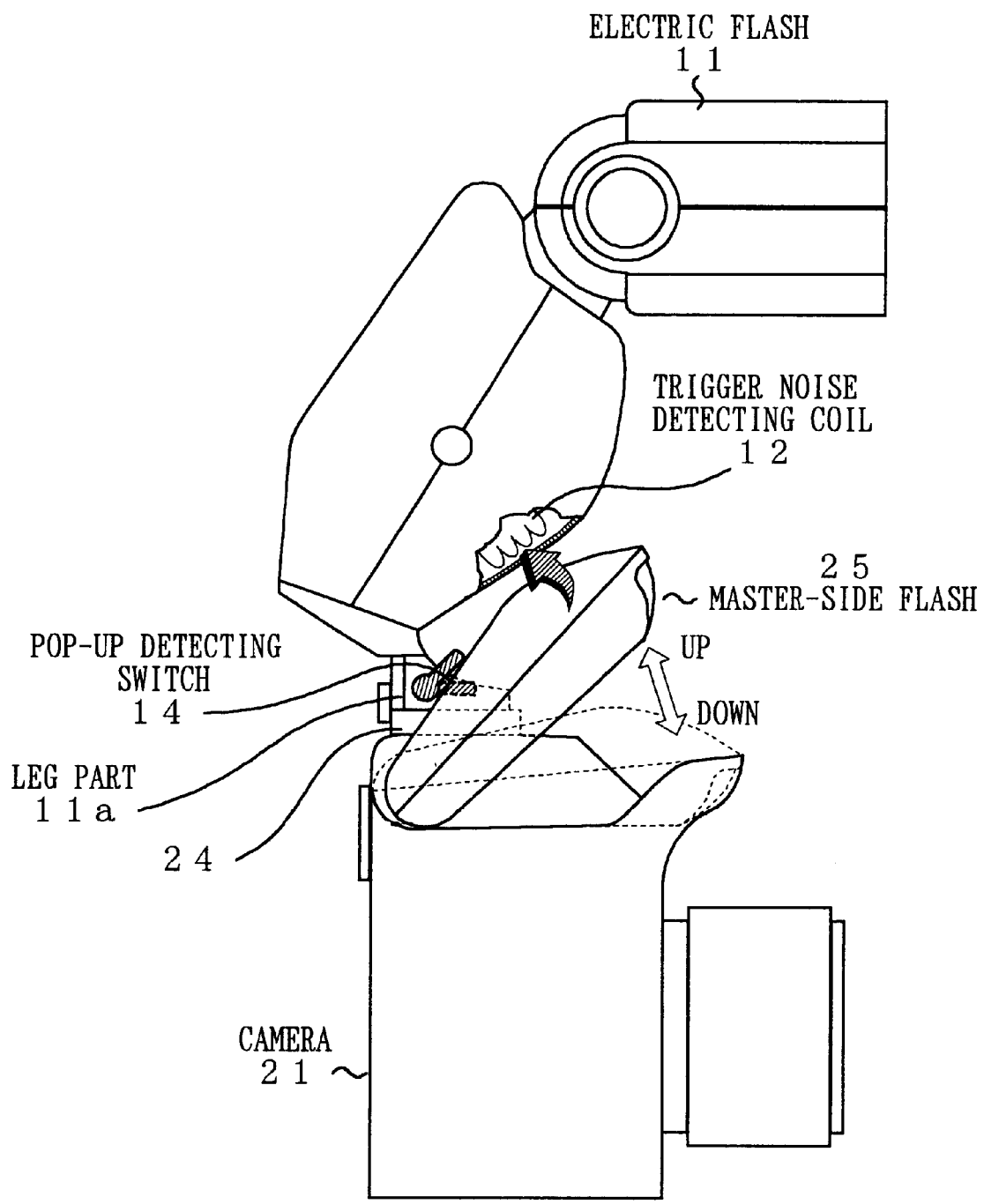
FIG. 1 is a view explaining the use of an electric flash 11 according to a first embodiment.

FIG. 1 is a view explaining the use of an electric flash 11 according to the first embodiment.

As in FIG. 1, a master-side flash 25 is built into a camera 21. The master-side flash is allowed to flash in a pop-up state.

Meanwhile, a leg part 11a of the electric flash 11 is attached to an accessory shoe 24 of the camera 21. The leg part 11a supports the electric flash 11 at a fulcrum at the back of the camera, so as not to prevent the pop-up of the master-side flash 25. Further, the electric flash 11 is bent forward so that its center of gravity is stabilized.

As it is bent forward, a lower part of the body of the electric flash 11 gets extremely closer to the master-side flash 25 in the pop-up state. A trigger noise detecting coil 12 for detecting trigger noise by electromagnetic induction is arranged at the lower part of the body.

Moreover, a pop-up detecting switch 14 is provided at the leg part 11a. The pop-up detecting switch 14 is usually applied with a downward force to maintain an on-state, and is pushed up by the pop-up of the master-side flash 25 to become an off-state. Further, the pop-up detecting switch 14 can be fixed in the off-state by being fully pushed up manually.

Figure 2:
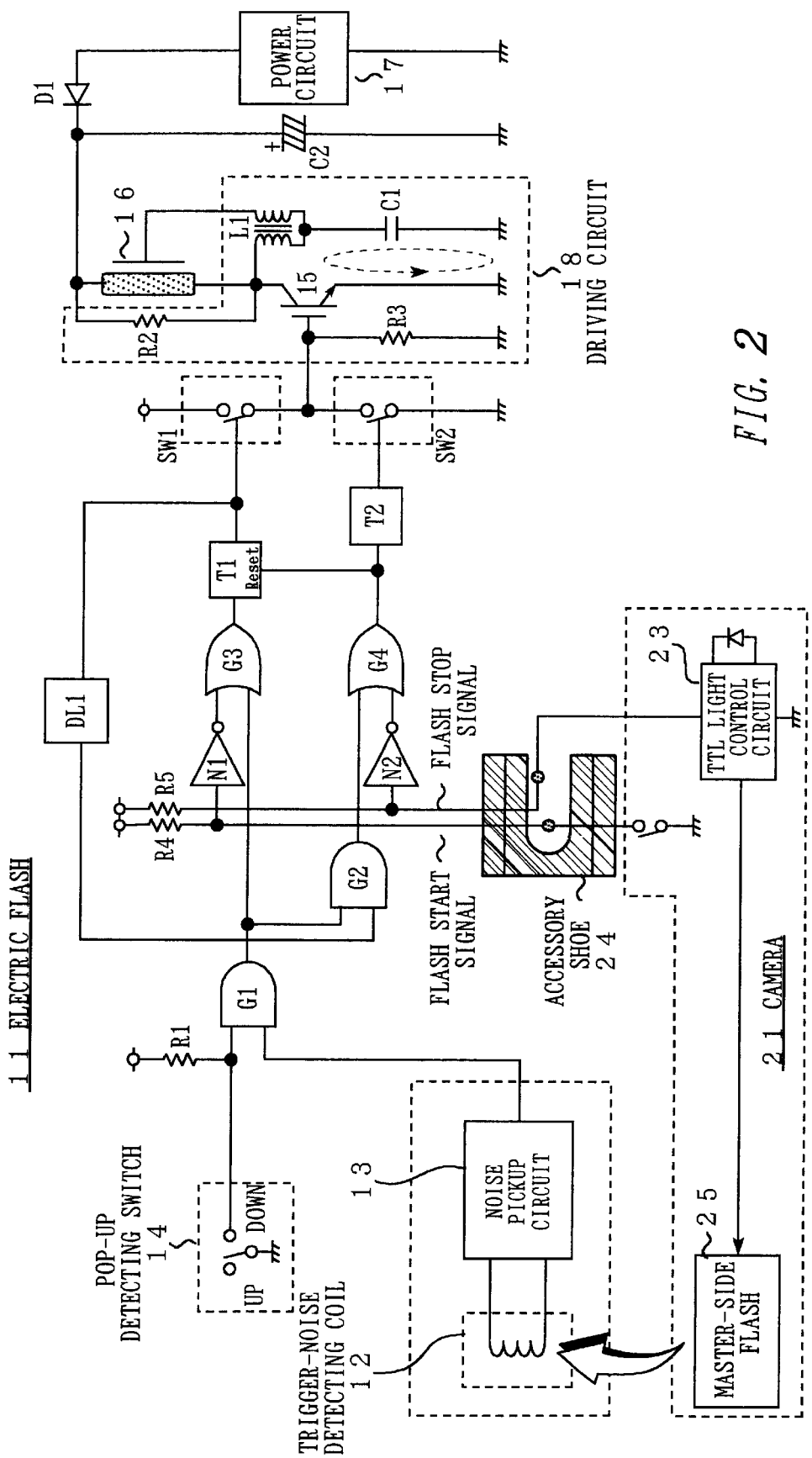
FIG. 2 is a view explaining an internal structure of the electric flash 11.

FIG. 2 is a view explaining an internal structure of the above electric flash 11.

As in FIG. 2, an output of the pop-up detecting switch 14 is pulled up by a resistor R1 and thereafter, it is connected to a first input of an AND gate G1. Meanwhile, the trigger noise detecting coil 12 is connected to a noise pickup circuit 13. An output of the noise pickup circuit 13 is connected to a second input of the AND gate G1.

An output of the AND gate G1 is connected to a first input of an AND gate G2 and a first input of an OR gate G3, respectively. An output of the OR gate G3 is connected to a trigger input of a one-shot timer circuit (monostable multivibrator) T1. An output of the one-shot timer circuit T1 is connected to a gate terminal of a switching element SW1 and an input of a delay circuit DL1, respectively. A delayed output of the delay circuit DL1 is connected to a second input of the AND gate G2. An output of the AND gate G2 is connected to a first input of an OR gate G4. An output of the OR gate G4 is connected to a reset input of the one-shot timer circuit T1 and a trigger input of a one-shot timer circuit T2. An output of the one-shot timer circuit T2 is connected to a gate terminal of a switching element SW2.

The aforementioned two switching elements SW1, SW2 are connected in series. A switching element SW1 side of the series connection is connected to a power line, and a switching element SW2 side thereof is connected to a ground line. Meanwhile, a midpoint of the series connection is connected to a gate terminal of an emitter-grounded IGBT (Insulated Gate Bipolar Transistor) 15. Incidentally, when the two switching elements SW1, SW2 are conducted at the same time, ON-resistance on the switching element SW1 side increases and a short-circuit current is limited (alternately, it is suitable to insert a resistor for preventing the short circuit into the switching element SW1 side).

The gate terminal of the IGBT 15 is connected to a ground line through a gate resistor R3. Further, a collector terminal of the IGBT 15 is connected to a boosting voltage line through a parallel connection of a resistor R2 and a xenon tube 16. A boosting voltage of the boosting voltage line is a voltage accumulated in an electrolytic capacitor C2 through a boosting power circuit 17 and a diode D1.

Moreover, the collector terminal of the IGBT 15 is connected to a ground line through a series connection of a primary winding of a trigger coil L1 and a capacitor C1. A midpoint of the series connection is connected to a trigger terminal of the xenon tube 16 through a secondary winding of the trigger coil L1. A driving circuit 18 of the xenon tube 16 is structured by the IGBT 15, the trigger coil L1, the capacitor C1 and the like.

Meanwhile, a flash start signal (what is called X-contact) and a flash stop signal are inputted from the camera 21 through the accessory shoe 24. The flash start signal is pulled up by a resistor R4 and thereafter, it is connected to a second input of the OR gate G3 through an inverter N1. Meanwhile, the flash stop signal is pulled up by a resistor R5 and thereafter, it is connected to a second input of the OR gate G4 through an inverter N2.

Figure 3:
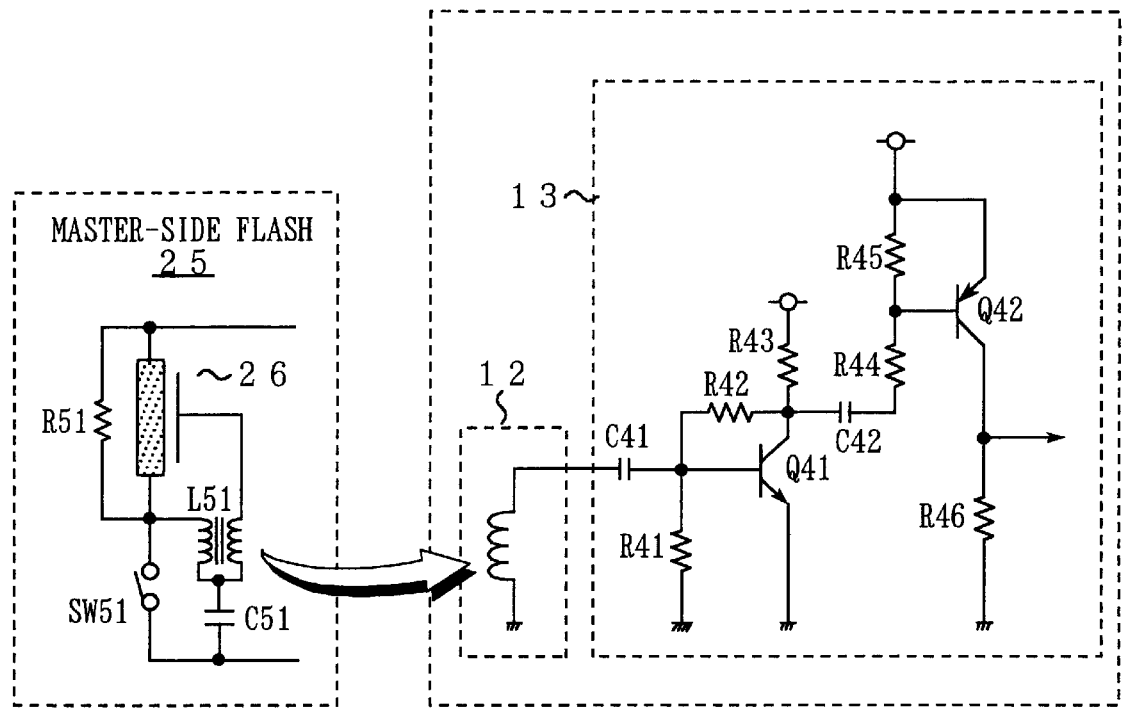
FIG. 3 is a view showing the structure of a noise pickup circuit 13.

FIG. 3 is a view showing the structure of the aforementioned noise pickup circuit 13.

As in FIG. 3, one end of the trigger noise detecting coil 12 is grounded. The other end of the trigger noise detecting coil 12 is connected to a base terminal of an emitter-grounded transistor Q41 through a capacitor C41. A collector terminal of the transistor Q41 is connected to a power line through a collector resistor R43. Further, a bias voltage is applied from a collector terminal side to the base terminal of the transistor Q41 through bias resistors R42, R41.

A collector voltage of the transistor Q41 is connected to a power line through a series connection of a capacitor C42, a resistor R44 and a resistor R45. A midpoint between the resistor R44 and the resistor R45 is connected to a base terminal of a transistor Q42. An emitter terminal of the transistor Q42 is connected to the power line, and a collector resistor R46 is connected to its collector terminal. A collector voltage of the transistor Q42 becomes an output of the noise pickup circuit 13.

Incidentally, an internal circuit of the master-side flash 25 is also shown in FIG. 3. In the internal circuit, a switching element SW51 which is directly controlled by the camera 21 is provided. One end of the switching element SW51 is grounded, and the other end is connected to the boosting voltage line inside the camera 21, through a parallel connection of a resistor R51 and a xenon tube 26. Further, the other end of the switching element SW51 is connected to a ground line through a series connection of a primary winding of a trigger coil L51 and a capacitor C51. A midpoint of the series connection is connected to a trigger terminal of the xenon tube 26 through a secondary winding of the trigger coil L51.

Explanation of the Correlation Between the First Embodiment and the Present Invention Hereinafter, the correlation between the first embodiment and the present invention will be explained. Incidentally, the following correlation exemplifies one aspect of the present invention for the reference purpose and is not intended to limit the invention.

A flash source according to claims corresponds to the xenon tube 16.

A trigger noise detecting part according to claims corresponds to the trigger noise detecting coil 12 and the noise pickup circuit 13.

A flash control part according to claims corresponds to the one-shot timer circuit T1, the switching element SW1 and the driving circuit 18. Incidentally, the flash control part according to claim 2 corresponds to the one-shot timer circuit T1, the switching element SW1, the one-shot timer circuit T2, the switching element SW2 and the driving circuit 18. Further, the flash control part according to claim 4 corresponds to the inverter N1, the OR gate G3, the inverter N2, the OR gate G4, the one-shot timer circuit T1, the switching element SW1, the one-shot timer circuit T2, the switching element SW2 and the driving circuit 18.

A detection invalid part according to claim corresponds to the delay circuit DL1, the one-shot timer circuit T1, the one-shot timer circuit T2 and the AND gate G2.

A leg part according to claims corresponds to the leg part 11*a*.

A determination part according to claims corresponds to the pop-up detecting switch 14.

A malfunction preventing part according to claims corresponds to the AND gate G1.

"Limitation of detection sensitivity in the trigger noise detecting part" according to claim is carried out by a threshold setting of the capacitor Q42 by the resistors R44, R45 and a gain setting of the capacitor Q41 by the resistors R41, R42, R43.

Explanation of the Operation of the First Embodiment

Figure 5:
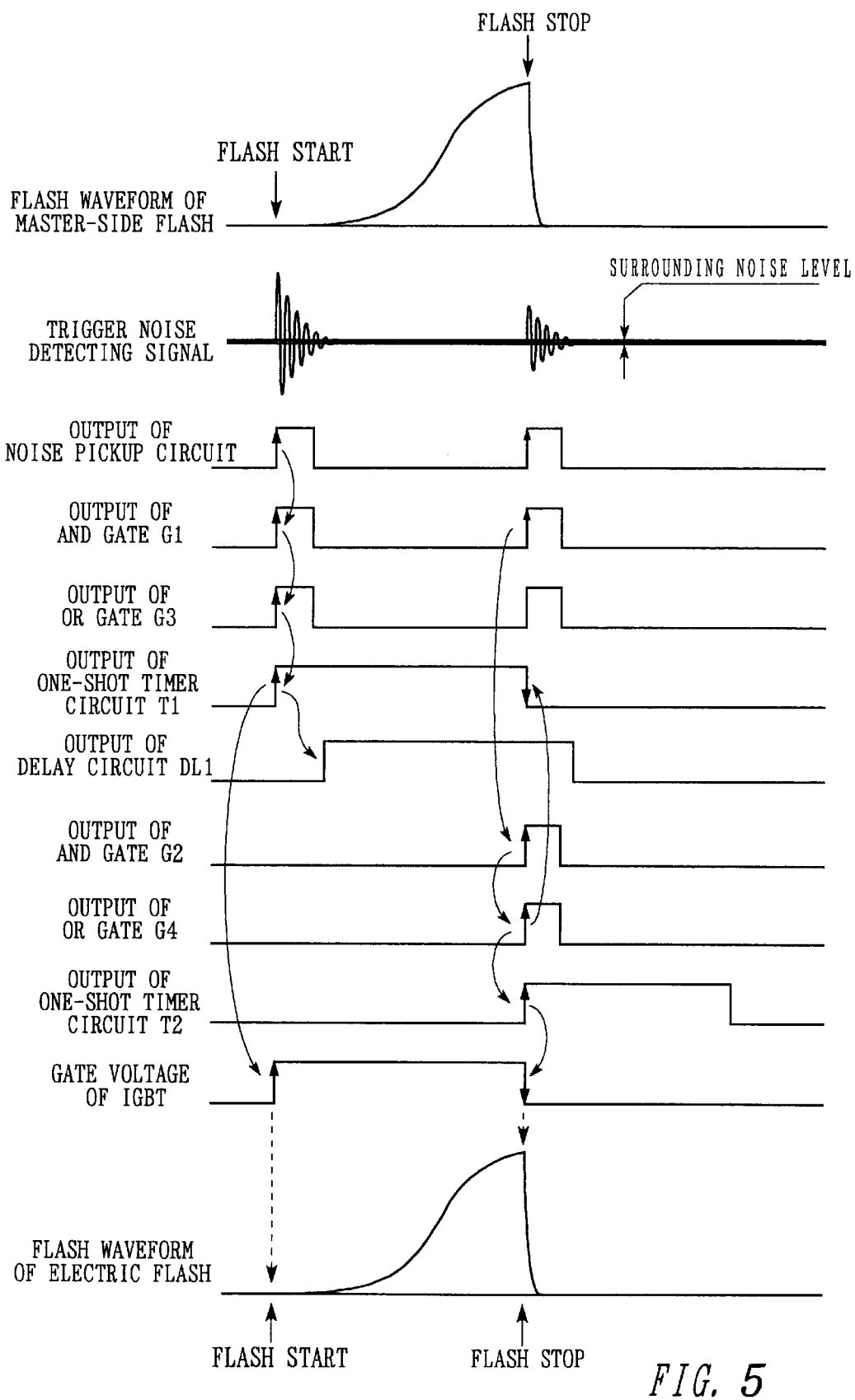
FIG. 5 is a timing chart explaining the operation of the first embodiment.

FIG. 5 is a timing chart explaining the operation of the first embodiment.

Hereinafter, the operation of the electric flash 11 will be explained with reference to FIG. 1 to FIG. 5.

First, when the master-side flash 25 is set to be able to flash (in the pop-up state, in this case), the boosting voltage for the flash light emission is accumulated in the capacitor in the camera 21. At this time, in the master-side flash 25 shown in FIG. 3, the boosting voltage is accumulated in the capacitor C51 through the resistor R51 and the primary winding of the trigger coil L51.

Meanwhile, in the electric flash 11, the pop-up detecting switch 14 is pressed up by the pop-up of the master-side flash 25. As a result of this, the first input of the AND gate G1 is set at a high level through the pull-up resistor R1.

When a release button or the like of the camera 21 is pressed under the above condition, the camera 21 switches the switching element SW51 to the on-state. At this time, the voltage charged in the capacitor C51 is discharged instantaneously through the primary winding of the trigger coil L51 and the switching element SW51. The discharged current generates an LC resonance and passes through the primary winding, and a trigger voltage of about several kV is generated in the secondary winding of the trigger coil L51.

The high-pressure trigger voltage is applied to the trigger terminal of the xenon tube 26 to activate gas filled in the tube. As a result, discharge starts between both poles of the xenon tube 26, and the flash starts.

In the above-described process of inducing the trigger voltage, the internal circuit of the master-side flash 25 emits the trigger noise to the outside. A frequency of the trigger noise is decided according to resonance frequencies of the trigger coil L51 and the capacitor C51, which is about 1 MHz, for example.

The trigger noise detecting coil 12 which is arranged close thereto detects the trigger noise, and generates a trigger noise detecting signal as shown in FIG. 5. As the above trigger noise detecting coil 12, for example, an inductor component of about several tens $\mu$H for general purpose use can be used.

The trigger noise detecting signal is amplified by, for example, about several ten times by an emitter-grounded amplifier circuit of the transistor Q41. The amplified trigger noise detecting signal is binarized through the transistor Q42. The detection sensitivity (partial pressure ratio between the R44 and R45 and the like) of the transistor Q42 is set so that it responds to the trigger noise, not to surrounding noise level.

By this operation, the output of the noise pickup circuit 13 rises to a high level at the time of controlling the flash start of the master-side flash 25.

The variance in the output of the noise pickup circuit 13 is transmitted to the trigger input of the one-shot timer circuit T1 through the AND gate G1 and the OR gate G3. As a result, pulse signals at a high level are outputted from the one-shot timer circuit T1 for a fixed period of time. Incidentally, the fixed period of time exceeds full flash time of the xenon tube 16.

At the same time, the variance in the output of the noise pickup circuit 13 is also transmitted to the first input of the AND gate G2 through the AND gate G1. However, the second input of the AND gate G2 is set at a low level by the delayed output of the delay circuit DL1. Hence, the output of the AND gate G2 does not vary and keeps the low level at this time.

The aforementioned pulse output of the one-shot timer circuit T1 permits the switching element SW1 to be conducted and the gate voltage of the IGBT 15 to be set at the high level. Hence, the IGBT 15 is conducted and the accumulated charge of the capacitor C1 flows through a discharge loop which is composed of the primary winding of the trigger coil L1 and the IGBT 15. The current in the discharge loop generates the LC resonance and induces a high voltage to the secondary winding of the trigger coil L1. The high voltage is applied to the trigger terminal of the xenon tube 16 to activate the gas in the tube. Meanwhile, the boosting voltage is applied to the both poles of the xenon tube 16 through the conducted IGBT 15. When all of the above conditions are met, the discharge is started inside the tube of the xenon tube 16 and the flash light emission of the electric flash 11 is started.

It should be noted that the electric flash 11 generates a weak trigger noise (hereinafter referred to as "spontaneous noise"), at the flash start. The trigger noise detecting coil 12 also detects the spontaneous noise. A detection pulse of the spontaneous noise is transmitted to the trigger input of the one-shot timer circuit T1 through the AND gate G1 and the OR gate G3. However, in the one-shot timer circuit T1 side, the output is already set to the high level and hence its operation is not affected thereby.

Meanwhile, the detection pulse of the spontaneous noise is also transmitted to the first input of the AND gate G2 through the AND gate G1. The delayed output of the delay circuit DL1 is inputted into the second input of the AND gate G2. The delay circuit DL1 delays the output pulse of the one-shot timer circuit T1 by a delay time enough for the spontaneous noise to disappear. For this reason, the second input of the AND gate G2 remains to keep the low level at the time of the generation of the spontaneous noise. Hence, the spontaneous noise at the flash start is ignored in the AND gate G2.

In parallel to the flash light emission as described above, a reflected light quantity of a film (or an imaging element or a shutter curtain) is started to be measured on a camera 21 side. The camera 21 times an adequate exposure with consideration given to the reflected light quantity and stops the flash light emission of the master-side flash 25.

On a master-side flash 25 side, the capacitor C51 is charged through the xenon tube 26 and the primary winding of the trigger coil L51, at the flash stop. The charged current generates the LC resonance and a high voltage is generated in the secondary winding of the trigger coil L51. As a result, the trigger noise is emitted from the master-side flash 25 to the outside even when the flash is stopped.

The trigger noise at the flash stop is detected by the trigger noise detecting coil 12. The noise pickup circuit 13 binalizes and outputs the trigger noise detecting signal.

As a result, the output of the noise pickup circuit 13 rises to the high level at the time of the control of the flash stop of the master-side flash 25.

The variance in the output of the noise pickup circuit 13 is transmitted to the first input of the AND gate G2 through the AND gate G1. Since the second input of the AND gate G2 is set at a high level by the delayed output of the delay circuit DL1 at this time, the output of the AND gate G2 rises to the high level.

The variance in the output of the AND gate G2 is transmitted to the reset terminal of the one-shot timer circuit T1 through the OR gate G4. As a result, the output of the one-shot timer circuit T1 is reset to the low level and the switching element SW1 is interrupted.

Meanwhile, the variance in the output of the AND gate G2 is also transmitted to the trigger input of the one-shot timer circuit T2 through the OR gate G4. As a result, the output of the one-shot timer circuit T2 is set to the high level for a fixed period of time. Incidentally, the fixed period of time is enough for the flash stop of the xenon tube 16.

By this operation, the switching element SW2 is conducted and the gate voltage of the IGBT 15 is set to the low level. For this reason, the IGBT 15 is interrupted and the flash light emission of the xenon tube 16 is stopped.

It should be noted that the electric flash 11 generates a weak spontaneous noise at the flash stop. The spontaneous noise is also detected by the trigger noise detecting coil 12. However, the one-shot timer circuit T2 maintains the high level at the time of the detection of the spontaneous noise at the flash stop, and hence the interruption of the IGBT 15 does not change. Hence, malfunctions, such as the repeated flash of the electric flash 11, are not caused thereby.

By the operation described above, the electric flash 11 carries out a slave flash while timing to the detection of the trigger noise.

Effect and the Like of the First Embodiment

According to the first embodiment, the slave flash is carried out according to the trigger noise of the master-side flash 25. Therefore, in contrast to a slave flash of a light-reception type, it is not necessary to arrange the electric flash 11 forcedly in a light path of the master-side flash 25. Hence, there is no possibility of erroneously interrupting illumination light of the master-side flash 25.

Further, according to the first embodiment, the trigger noise which is generated at the time of the flash control is detected. Therefore, the detection timing is quicker than that of a conventional example, and the slave flash can be easily carried out almost simultaneously with the master side.

Moreover, according to the first embodiment, the detection operation of the spontaneous noise is invalidated based on the control timing of the slave flash. Therefore, it is possible to prevent an erroneous flash which is caused by the spontaneous noise.

Furthermore, according to the first embodiment, the OR gates G3, G4 are provided to OR the flash control signal from the camera 21 side and the trigger noise detecting signal. As a result, the flash of the electric flash 11 is controlled based on one signal which is preceding. The other signal which is succeeding is ignored by signal duration time of the one-shot timer circuits T1, T2. Therefore, the flash control signal and the detection of the trigger noise do not compete with each other, and it is of course that malfunctions are not caused by the competition.

Further, according to the first embodiment, the flash control by the trigger noise is prohibited by the action of the AND gate G1, when the master-side flash 25 is received in the camera 21. For this reason, it is possible to prevent the malfunctions of the electric flash 11 without fail by receiving the master-side flash 25 in the camera 21. Incidentally, the electric flash 11 smoothly carries out the flash control based on the flash control signal by the action of the OR gates G3, G4, with the master-side flash 25 being received in the camera 21 as described above.

Moreover, according to the first embodiment, a lower limit of the detection sensitivity is set by the noise pickup circuit 13 to discriminate between the trigger noise and an electromagnetic wave from a distance. Therefore, the erroneous flash due to the electromagnetic wave from a distance can be prevented.

Figure 4:
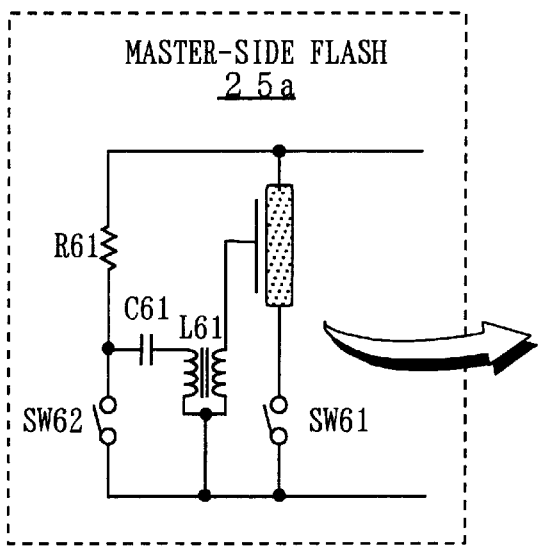
Figure 6:
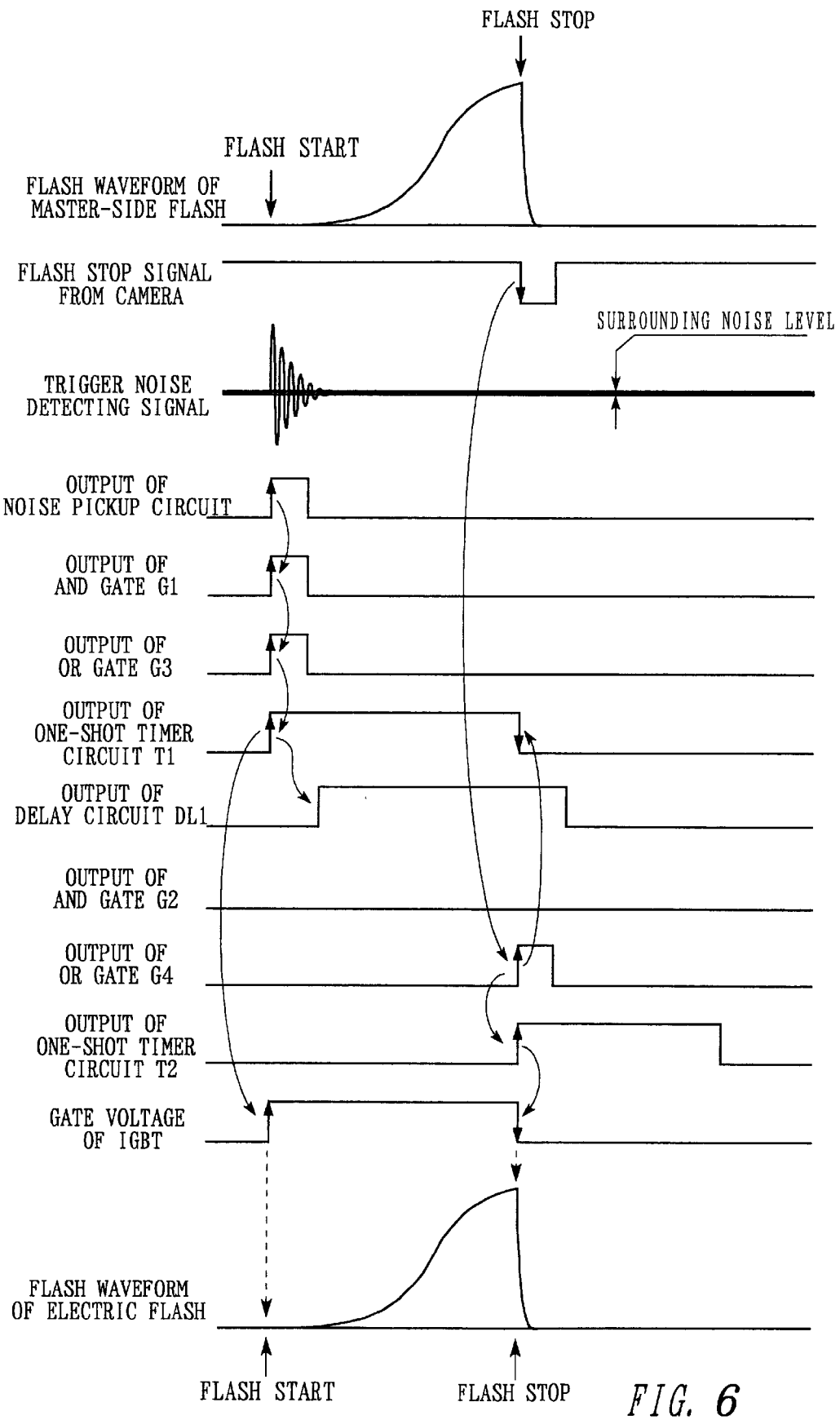
FIG. 6 is a timing chart explaining another operation of the electric flash 11.

Incidentally, in the aforementioned first embodiment, the explanation is made by taking the master-side flash 25 shown in FIG. 3 as an example. However, the master-side flash which is used by being paired with the electric flash 11 is not limited to the above. For example, it may be used with a master-side flash 25a as shown in FIG. 4. In the master-side flash 25a, the generation of the trigger voltage and the application of the voltage between the poles of the xenon tube are controlled by switching elements SW61, SW62 which are independent of each other, and hence the trigger noise is not generated at the time of the flash stop. In this case, the electric flash 11 carries out multiple operations of starting the slave flash by detecting the trigger noise and stopping the slave flash based on the flash stop signal, as shown in FIG. 6.

Figure 7:
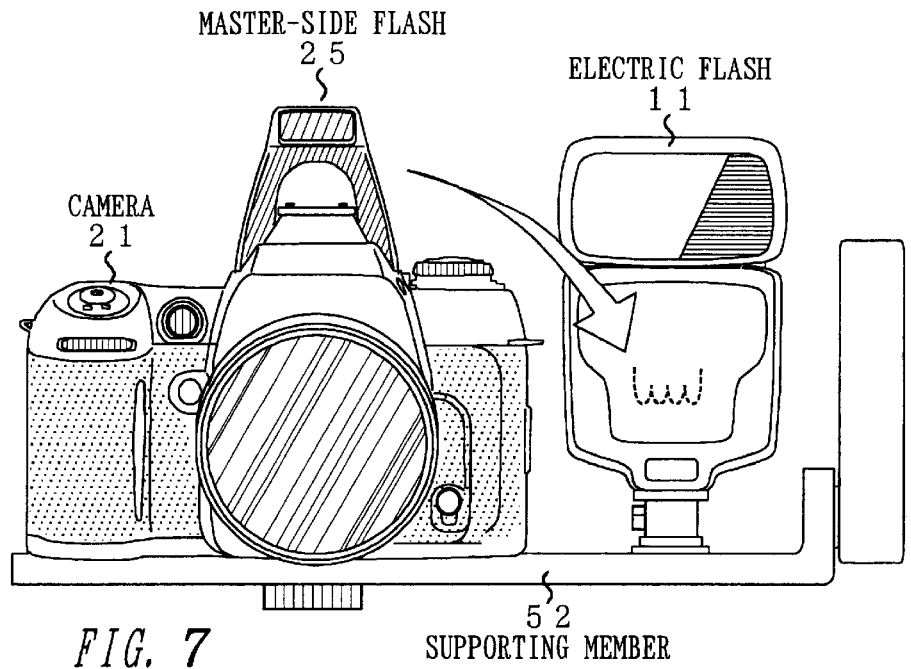
FIG. 7 is a view explaining another use of the electric flash 11.

Furthermore, according to the aforementioned first embodiment, the electric flash 11 is attached to the accessory shoe 24, but the present invention is not limited to the above. For example, the camera 21 and the electric flash 11 may be integrally structured by using a supporting member 52, as shown in FIG. 7. In this case, the pop-up detecting switch 14 is pushed up manually to lock it, whereby the slave flash of a trigger noise detection type can be carried out appropriately.

Next, another embodiment will be explained.

Second Embodiment

The second embodiment of the present invention is an embodiment of a connector (a light control cord, in this case) corresponding to claim 8.

Figure 8:
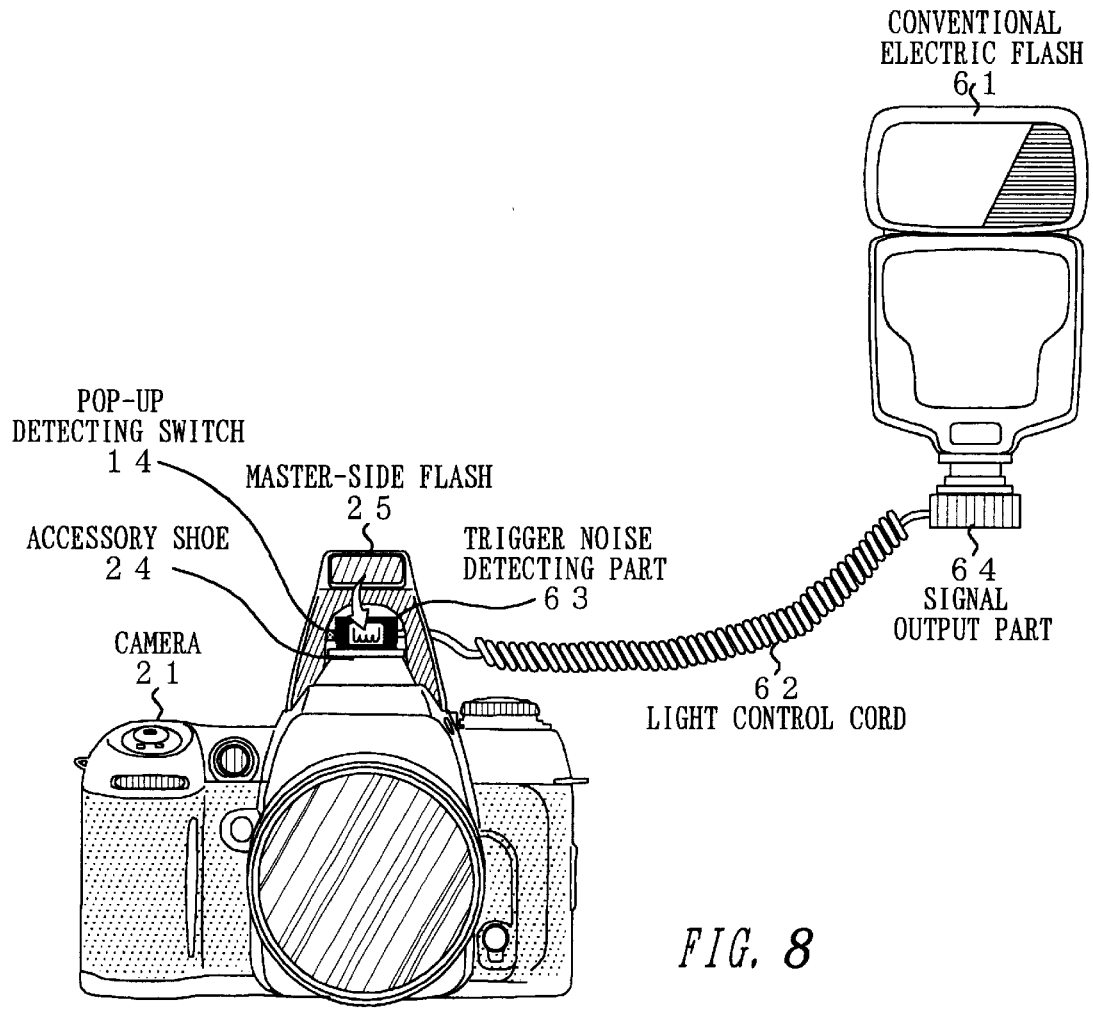
FIG. 8 is a view showing a light control cord 62 according to a second embodiment.

FIG. 8 is a view showing a light control cord 62.

As shown in FIG. 8, the light control cord 62 connects an accessory shoe 24 of a camera 21 and a conventional electric flash 61.

A trigger noise detecting part 63 and a contact group for acquiring a flash control signal from the camera 21 are provided at a connecting unit of the light control cord 62 on a camera side. Meanwhile, a signal output part 64 is provided at a connecting unit of the light control cord 62 on the electric flash 61 side.

Figure 9:
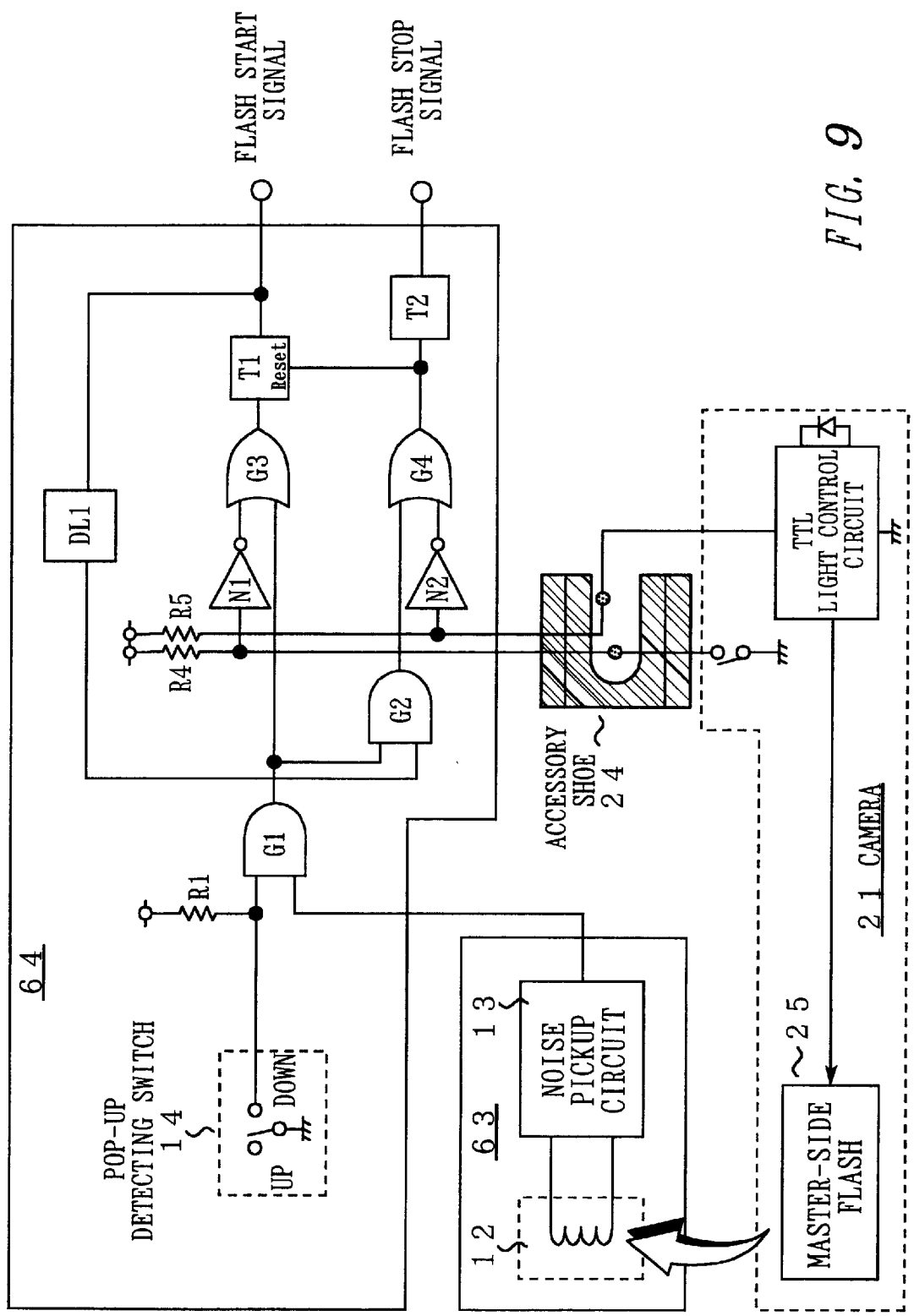
FIG. 9 is a view showing the structure of an internal circuit of the light control cord 62.
Figure 10:
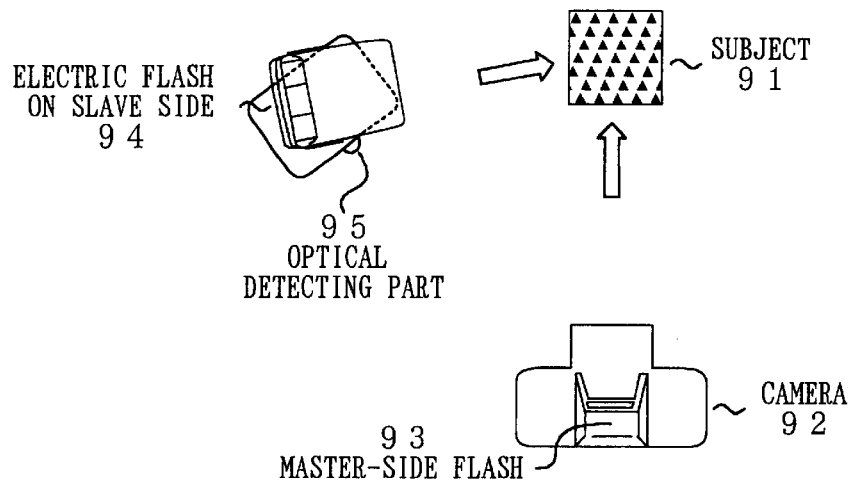
FIG. 10 is a view showing multiple flash photography in the conventional art.
Figure 11:
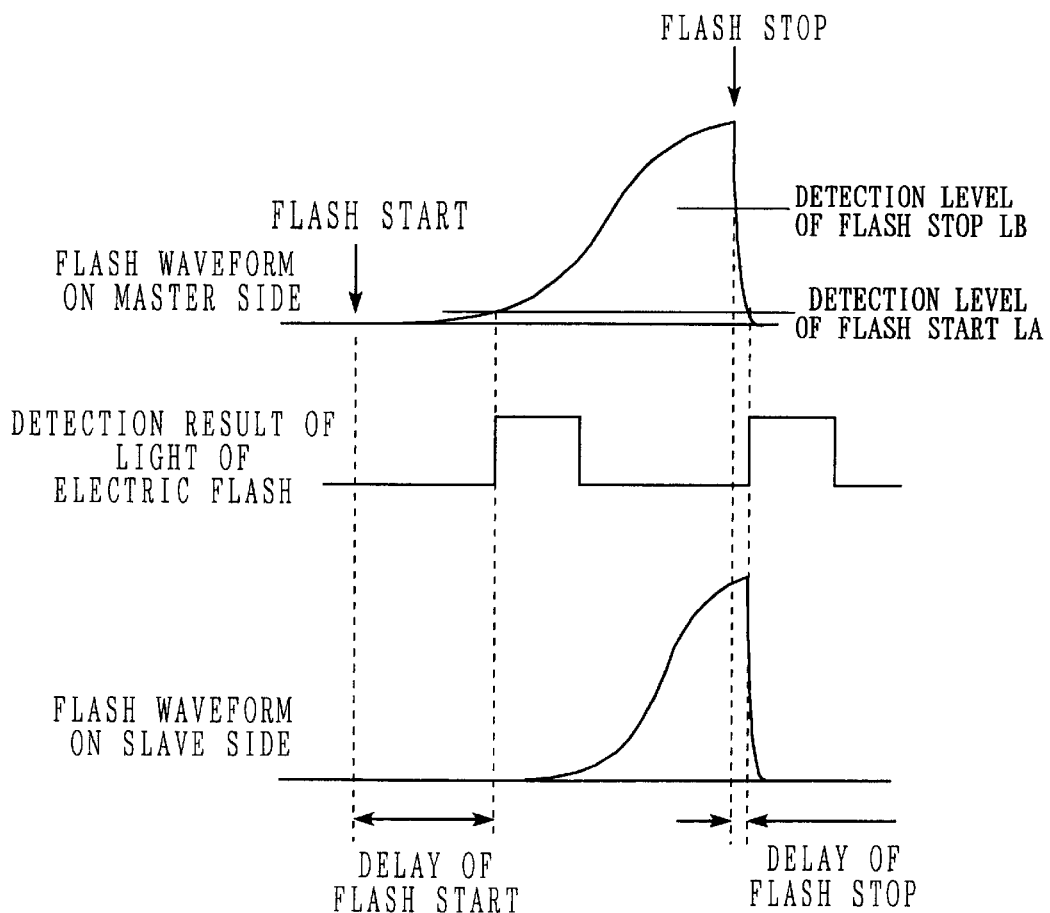
FIG. 11 is a timing chart explaining the operation of the slave flash in the conventional art.

FIG. 9 is a view showing the structure of an internal circuit of the light control cord 62.

Incidentally, the concrete structure of the internal circuit shown in FIG. 9 is the same as that in FIG. 2 and hence, the same numerals and symbols are given, and detailed explanations thereof are omitted.

Since the trigger noise detecting part 63 is arranged near a master-side flash 25, it detects the trigger noise efficiently. After amplifying and shaping a waveform of a trigger noise detecting signal, the trigger noise detecting part 63 outputs it to the signal output part 64.

A flash start signal and a flash stop signal are generated in the signal output part 64, based on the trigger noise detecting signal whose waveform is shaped and a flash control signal from the camera 21.

Thus-generated flash start signal and flash stop signal are transmitted to the electric flash 61.

By this operation, the slave flash of a trigger noise detection type can be easily carried out by using the conventional electric flash 61.

Effect and the Like of the Second Embodiment

Being thus structured, it is possible to obtain the same effects as those of the first embodiment in the second embodiment.

The effect which is specific to the second embodiment is that the camera 21 and the electric flash 61 can be arranged freely by disposing the light control cord 62 therebetween.

Incidentally, the explanation is made by using the light control cord as an example of the connector. However, the embodiment of the connector is not limited to the above. For example, it is suitable to use a connector of an adopter type which is arranged between the accessory shoe and the electric flash to connect these.

Supplement to the Embodiments

Incidentally, in the above-described embodiments, the trigger noise is discriminated by limiting the detection sensitivity of the noise pickup circuit 13. However, the present invention is not limited to the above. The trigger noise may be discriminated by, for example, limiting a detection frequency or a detection waveform. Further, the trigger noise can be discriminated more accurately by combining these limitations.

Moreover, in the above-described embodiments, the pop-up state of the master-side flash 25 is determined to determine whether the master-side flash 25 is able to flash or not. However, the present invention is not limited to this determination method. For example, it is suitable that the electric flash communicates with the camera to acquire information whether it is able to flash or not (whether the accumulation of the boosting voltage is complete or not).

Further, in the above-described embodiments, the master-side flash 25 is built into the camera, which is not restrictive. For example, the master-side flash may be externally attached thereto.

Furthermore, in the above-described embodiments, the explanation is made about the case of using the entire device as the circuit. However, the present invention is not limited to the above. A part of the device may be replaced by a microprocessor, and the invention may be embodied by the processing of the software. For example, the detection invalid part according to claim may be realized by the processing of the software.

The invention is not limited to the above embodiments and various modifications may be made without departing from the spirit and the scope of the invention. The present embodiment is therefore to be considered in all respects as illustrative and not restrictive. Any improvement may be made in part or all of the components

What is claimed is:

1. An electric flash disposed for use close to a master-side flash whose flashing is controlled by a camera, comprising:
    a flash source for emitting flash light to illuminate a subject;
    a trigger noise detecting part for detecting trigger noise generated from said master-side flash;
    a flash control part that allows said flash source to start emitting flash light in synchronization with trigger noise detected by said trigger noise detecting part, and that allows said flash source to stop the light emission in synchronization with another trigger noise detected by said trigger noise detecting part after the start of the light emission; and
    a detection invalid part for invalidating the trigger noise detection in synchronization with a flash control timing of said flash control part to prevent said flash control part from malfunctioning due to spontaneous noise.

2. The electric flash according to claim 1, wherein
    said flash control part has a function of accepting a flash control signal supplied from said camera, and inhibits the flash control by the trigger noise and performs the flash control by the flash control signal when the supply of the flash control signal precedes the detection of said trigger noise.

3. The electric flash according to claim 1, wherein
    at least one of detection sensitivity, detection frequency, and detection waveform is/are limited in said trigger noise detecting part in order to detect not an electromagnetic wave from a distance but the trigger noise from said master-side flash disposed close thereto.

4. An electric flash disposed for use close to a master-side flash whose flashing is controlled by a camera, comprising:
    a flash source for emitting flash light to illuminate a subject;
    a trigger noise detecting part for detecting trigger noise generated from said master-side flash;
    a flash control part for performing flash control of said flash source in synchronization with trigger noise detected by said trigger noise detecting part; and
    a leg part being attached to an accessory shoe of said camera, wherein
    said leg part supports said electric flash in such a manner that said electric flash keeps its standing posture within an area outside an area in which the master-side flash moves when popping up from said camera.

5. The electric flash according to claim 4, further comprising:
    a determination part for determining whether or not said master-side flash has popped up, and for determining that said electric flash is in a popped-down state when said electric flash is detached from said camera; and a malfunction preventing part for inhibiting the flash control by said trigger noise, when said determination part determines that said master-side flash is in the popped-down state.

6. A connector for connecting an accessory shoe of a camera with an electric flash, comprising:

a trigger noise detecting part provided on a side connected to said accessory shoe, for detecting trigger noise generated from a master-side flash built into said camera; and a signal output part for outputting to said electric flash a signal for starting emitting flash light, in synchronization with trigger noise detected by said trigger noise detecting part, and for outputting to said electric flash a signal for stopping the light emission, in synchronization with another trigger noise detected by said trigger noise detecting part after the start of the light emission; and a detection invalid part for invalidating the trigger noise detection in synchronization with a flash control timing of said electric flash to prevent said electric flash from malfunctioning due to spontaneous noise.

* * * * *